United States Patent
Fees et al.

(10) Patent No.: US 10,707,470 B2
(45) Date of Patent: Jul. 7, 2020

(54) ENERGY STORAGE ARRANGEMENT, IN PARTICULAR FOR A MOTOR VEHICLE, MOTOR VEHICLE AND METHOD FOR PRODUCING AN ENERGY STORAGE RECEPTACLE FOR AN ENERGY STORAGE ARRANGEMENT

(71) Applicant: AUDI AG, Ingolstadt (DE)

(72) Inventors: Heiner Fees, Bietigheim-Bissingen (DE); Alexander Eichhorn, Eppingen (DE); Ralf Maisch, Abstatt (DE)

(73) Assignee: AUDI AG, Ingolstadt (DE)

( * ) Notice: Subject to any disclaimer, the term of this patent is extended or adjusted under 35 U.S.C. 154(b) by 365 days.

(21) Appl. No.: 15/235,344

(22) Filed: Aug. 12, 2016

(65) Prior Publication Data
US 2017/0047573 A1 Feb. 16, 2017

(30) Foreign Application Priority Data

Aug. 14, 2015 (DE) .......................... 10 2015 215 597

(51) Int. Cl.
*H01M 2/20* (2006.01)
*H01M 2/02* (2006.01)
(Continued)

(52) U.S. Cl.
CPC ........... *H01M 2/206* (2013.01); *H01M 2/027* (2013.01); *H01M 2/0242* (2013.01);
(Continued)

(58) Field of Classification Search
CPC ............ H01M 10/0431; H01M 10/10; H01M 2/0482; H01M 2/206; H01M 2/027;
(Continued)

(56) References Cited

U.S. PATENT DOCUMENTS 3,056,850 A * 10/1962 Rauske ............... H01M 2/0202
429/157
2011/0293986 A1* 12/2011 Kozu .................... H01M 2/105
429/120
(Continued)

FOREIGN PATENT DOCUMENTS

CN 1237275 A 12/1999
CN 1650376 A 8/2005
(Continued)

OTHER PUBLICATIONS

Heinz Willi Hassen, U.S. Pat. No. 8,975,774, Mar. 10, 2015, 2014-0117754, May 1, 2014.
(Continued)

*Primary Examiner* — Jonathan G Leong
*Assistant Examiner* — Aaron J Greso
(74) *Attorney, Agent, or Firm* — Henry M. Feiereisen LLC

(57) ABSTRACT

An energy storage arrangement includes an energy storage receptacle which has multiple cup-shaped receiving compartments and energy storages respective positive and a negative electrode and being received in the receiving compartments, wherein one of the electrodes of each of the energy storages is in electrically conductive contact with the receiving compartment that receives the respective energy storage and the electrodes of all energy storages that are in contact with the energy storage receptacle are electrically conductively connected via the energy storage receptacle.

12 Claims, 3 Drawing Sheets

(51) Int. Cl.
*H01M 2/04* (2006.01)
*H01M 2/10* (2006.01)
*H01M 10/04* (2006.01)

(52) U.S. Cl.
CPC ....... *H01M 2/0285* (2013.01); *H01M 2/0482* (2013.01); *H01M 2/1077* (2013.01); *H01M 10/0431* (2013.01)

(58) Field of Classification Search
CPC ............. H01M 2/0285; H01M 2/0242; H01M 2/1077; H01M 2/10; H01M 2/02; H01M 2/04; H01M 2/20
See application file for complete search history.

(56) References Cited

U.S. PATENT DOCUMENTS

| | | |
|---|---|---|
| 2013/0295437 A1 | 11/2013 | Kozlik |
| 2014/0093766 A1 | 4/2014 | Fees |
| 2014/0178723 A1 | 6/2014 | Tsujioka |
| 2014/0377622 A1* | 12/2014 | Glauning ............ H01M 10/613 429/120 |
| 2014/1377622 | 12/2014 | Glauning |

FOREIGN PATENT DOCUMENTS

| | | | |
|---|---|---|---|
| CN | 102931374 A | 2/2013 | |
| CN | 104377335 A | 2/2015 | |
| EP | 2 744 015 A1 | 6/2014 | |
| JP | 2002-289159 | * 10/2002 | ............ H01M 10/40 |
| WO | WO 2012/107365 A1 | 8/2012 | |

OTHER PUBLICATIONS

Chinese Search Report dated Oct. 8, 2018 with respect to counterpart Chinese patent application 2016106632697.

Translation of Chinese Search Report dated Oct. 8, 2018 with respect to counterpart Chinese patent application 2016106632697.

* cited by examiner

ENERGY STORAGE ARRANGEMENT, IN PARTICULAR FOR A MOTOR VEHICLE, MOTOR VEHICLE AND METHOD FOR PRODUCING AN ENERGY STORAGE RECEPTACLE FOR AN ENERGY STORAGE ARRANGEMENT

CROSS-REFERENCES TO RELATED APPLICATIONS

This application claims the priority of German Patent Application, Serial No. 10 2015 215 597.8 filed Aug. 14, 2015, pursuant to 35 U.S.C. 119(a)-(d), the content of which is incorporated herein by reference in its entirety as if fully set forth herein.

BACKGROUND OF THE INVENTION

The present invention relates to an energy storage arrangement in particular for a motor vehicle.

The following discussion of related art is provided to assist the reader in understanding the advantages of the invention, and is not to be construed as an admission that this related art is prior art to this invention.

High-performance energy storage arrangements for electrically driven motor vehicles have recently become the focus of development efforts in the automobile industry. In a typical construction of such storage arrangements a defined number of energy storage cells are for example connected parallel to each other via busbars in order to achieve an addition of their storage capacity. Multiple of these parallel-connected energy storage cells are then connected in series for generating the desired output voltage.

The energy storage cells used therefore are each closed units in which the actual energy storage, including a type-dependent arrangement of a positive and a negative electrode, is received in a housing of the energy storage cell. In the energy storage cell an electrically conductive inner contact with the housing of the energy storage cell and a further inner contact with a terminal connection of the energy storage cell are provided. When connecting two energy storage cells in parallel with each other their energy storages are thus connected via their inner contacts and outer contacts that are required for the connecting together between the busbars and the housings of the energy storage cells or the terminal connections.

Each of these electrical contacts however has an electrical resistance at which a electrical voltage drops. The losses generated thereby are significant. In addition the high number of contacts requires increased space and increases the complexity of the manufacturing process. The risks of errors and costs associated therewith eventually lead to significant loss of efficiency during operation of conventional energy storage arrangements.

It would therefore be desirable and advantageous to provide an improved energy storage arrangement

SUMMARY OF THE INVENTION

According to one aspect of the present invention an energy storage arrangement, includes an energy storage receptacle having multiple cup-shaped receiving compartments; and energy storages received in the receiving compartments, wherein the energy storages each have a positive and a negative electrode, with a respective one of the positive and negative electrodes of each of the energy storages being in electrically conductive contact with a respective one of the receiving compartments in which the energy storage is received, wherein all electrodes of all energy storages in electrically conductive contact with the energy storage receptacle are electrically conductively connected with each other via the energy storage receptacle.

According to the invention it is thus proposed to provide an energy storage receptacle, which has multiple cup-shaped receiving compartments which are respectively provided for receiving an energy storage with a positive and a negative electrode. Hereby electrodes of same polarity, preferably the negative electrodes, of the energy storages are in electrically conductive contact with the receiving compartment that receives the respective energy storage which electrically conductively connects these electrodes with each other via the energy storage receptacle. The energy storages are thus received directly in the energy storage receptacle in the absence of a housing that surrounds the electrodes. In this way a separate housing of each energy storage is not required. Connections required between the electrodes of same polarity to connect the energy storages in parallel are realized via the energy storage receptacle and can already be generated during the manufacturing process of the energy storage arrangement. Preferably the energy storage arrangement according to the invention is used in a motor vehicle or other land vehicles that have users that have to be supplied with electrical energy such as rail bound vehicles, but may also be used in air vessels and space or water vessels. In addition stationary applications are also conceivable such as in buildings for example as buffer storage for the supply of a low-voltage network.

The invention in particular advantageously obviates conventionally provided busbars so that an external contact for generating the parallel connection is not required. The electrical resistances generated thereby are thus reduced and a significantly more efficient operation of the energy storage arrangement is possible. In addition process risks during generating an external contacting are avoided which in particular renders operation of the energy storage arrangement less error prone.

According to another advantageous feature of the energy storage arrangement according to the invention, the energy storage receptacle can have multiple separately formed receiving compartments for a respective single energy storage. Thus each energy storage is assigned a separate cup-shaped receiving compartment so that the energy storage receptacle when viewed in cross section completely surrounds each energy storage. As an alternative it can be provided that the energy storage receptacle has multiple connected receiving compartments for all energy storages. In this case the energy storages are arranged in a common connected space in the energy storage receptacle which when viewed in cross section only partially surrounds each energy storage.

According to another advantageous feature of the energy storage arrangement according to the invention, the electrodes of the energy storages that are contacted with the energy storage receptacle are each contacted with a bottom of the receiving compartment in which they are received. When due to the design of the energy storage these electrodes are situated close to the bottom of the receiving compartment when the energy storage is received in the receiving compartment this enables particularly short contact distances and thus particularly low contacting resistances.

Furthermore for a most simple manufacturing of the energy storage arrangement it is particularly advantageous when the energy storage receptacle is produced in one piece by deep drawing of a sheet metal part. The cup-shaped receiving compartments are thus formed into the sheet metal that is provided as starting material as one or multiple depressions. Such an energy storage receptacle can be manufactured in high numbers and at low costs so that a particularly efficient production of the energy storage arrangement is possible.

According to another advantageous feature of the energy storage arrangement according to the invention, a cover element that electrically insulatingly closes the receiving compartments can be provided, which has a connecting section, which electrically conductively connects those electrodes of the energy storages with each other that are not contacted with the energy storage receptacle. Such a cover element thus has a connecting section, which is electrically conductively connected with the electrode which is not contacted with the energy storage arrangement, in particular the positive electrode of a respective energy storage. The cover element is hereby of course not electrically conductively connected with the energy storage receptacle in order to avoid a short circuit. For this purpose the cover element can have insulting sections, in particular in those regions in which it contacts the energy storage receptacle. Hereby it is particularly preferred when the cover element rests on the energy storage receptacle so as to cover all open regions of the cup-shaped receiving compartments completely. The connecting sections are advantageously situated directly opposite the electrodes with which they are to be contacted so that also on this electrode advantageously a particularly short contacting path is possible. The cover element connects all energy storages in parallel so that the energy storage arrangement can be operated connected in series via corresponding provided connections on the connecting sections of the cover element and the energy storage receptacle individually or with further energy storage arrangements according to the invention.

As an alternative to the cover element having the connecting section that electrically conductively connects the electrodes with each other, a respective cover element that electrically insulates the receiving compartments against the energy storage receptacle can be provided for each receiving compartment, which cover element has a connecting section which is electrically conductively connected with the electrode that is not in contact with the energy storage receptacle. In this embodiment each receiving compartment is closed by means of a cover element, which has a connecting section for contacting the electrode, in particular the positive electrode, on the side of the cover element. Hereby the cover elements are preferably respectively arranged on an inner border of the receiving compartment to be closed, and have an insulation relative to the energy storage receptacle, for example a ring-shaped insulating section. On the connecting sections the potential of the electrodes that are contacted by the connecting sections can be accessed directly from the outside.

According to another advantageous feature of the energy storage arrangement according to the invention, the geometric shape of the receiving compartment can correspond at least in regions to the geometric shape of the energy storages received in the receiving compartments. This achieves a most effective utilization of space of the receiving compartments. It is hereby particularly preferred when the energy storages are configured as cell coil of a cylindrical round cell, in particular of the type 18650. The receiving compartments are then respectively shaped cylindrically and completely receive the energy storage.

According to another aspect of the invention a motor vehicle, includes an energy storage compartment, which includes an energy storage receptacle having multiple cup-shaped receiving compartments, and energy storages received in the receiving compartments, said energy storages each having a positive and a negative electrode, with a respective one of the positive and negative electrodes of each of the energy storages being in electrically conductive contact with a respective one of the receiving compartments in which the energy storage is received, wherein all electrodes of all energy storages in electrically conductive contact with the energy storage receptacle are electrically conductively connected with each other via the energy storage receptacle. In particular the at least one energy storage arrangement can be provided for supplying a drive device of one or more users of the motor vehicle. It is further particularly preferred when multiple energy storage arrangements are provided which are connected to each other in series.

According to another aspect of the invention a method for producing an energy storage receptacle for an energy storage arrangement according to the invention includes forming multiple receiving compartments in a sheet metal part by deep drawing, said multiple receiving compartments being configured for receiving a respective energy storage. As mentioned above in this enables a particularly cost-effective manufacturing of the energy storage receptacles also in large numbers.

According to another advantageous feature of the method according to the invention, regions of the sheet metal that are not provided for the receiving compartments can have a smaller material thickness than regions of the sheet metal that are provided for the receiving compartments. The sheet metal is hereby already prepared in such a manner that regions into which a tool for deep drawing enters for forming the receiving compartments have a corresponding material reinforcement so that the one or multiple receiving compartments can be formed in the required depth. It is hereby particularly preferred when the sheet metal part is a tailored blank, which has the regions of different material thickness due to a processing in a corresponding rolling process.

According to another advantageous feature of the method according to the invention, the receiving compartments can be formed separate in the sheet metal part for receiving a respective single energy storage.

According to another advantageous feature of the method according to the invention, the receiving compartments can be formed in the sheet metal part so as to be connected for receiving all of a plurality of energy storages.

According to another advantageous feature of the method according to the invention, the receiving compartments can each at least in regions formed in with a geometric shape, which corresponds to the geometric shape of the energy storage to be received therein.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
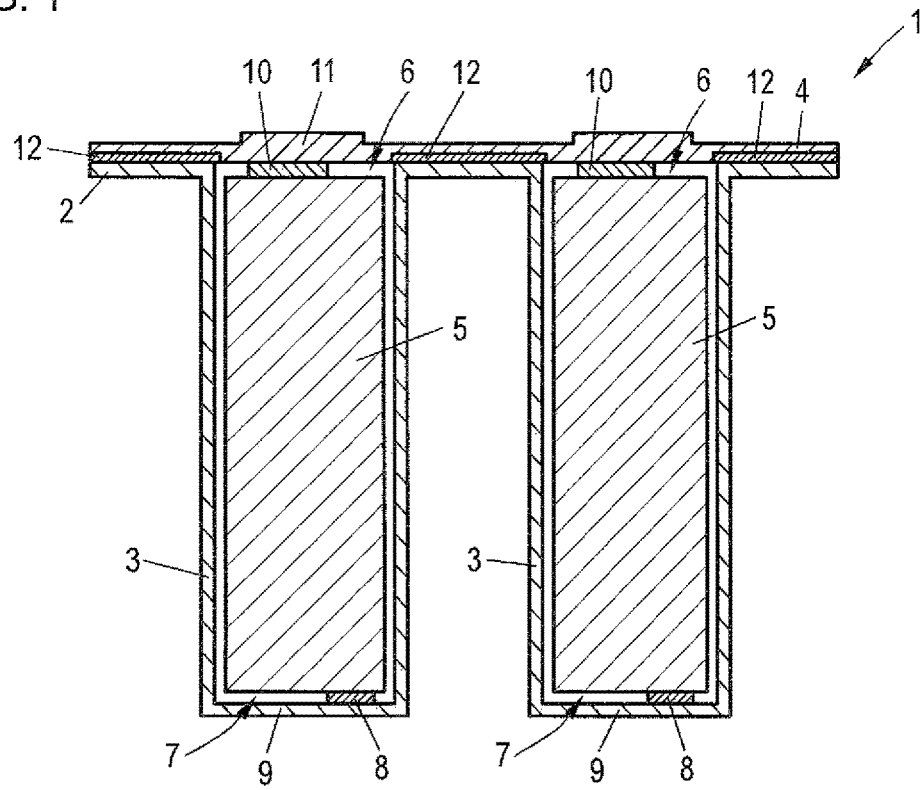
FIG. 1 shows a longitudinal sectional view of an exemplary embodiment of an energy storage arrangement.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
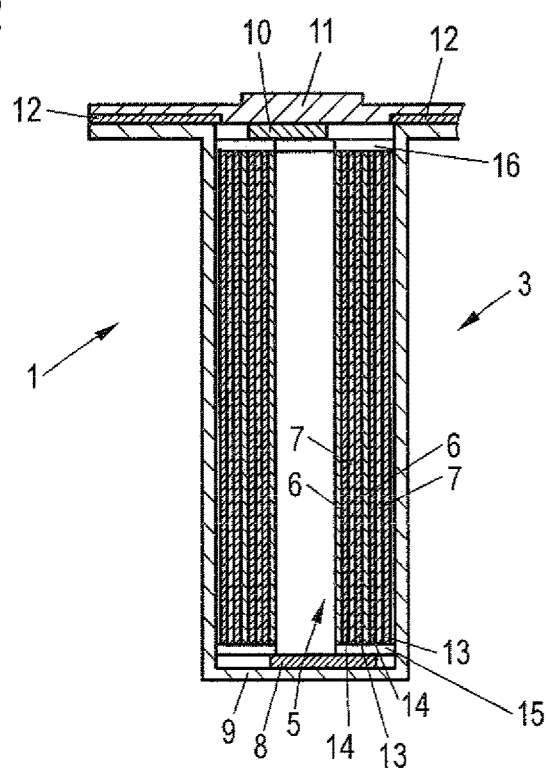
FIG. 2 shows a detail view of a receiving compartment of the energy storage arrangement.
Figure 3:
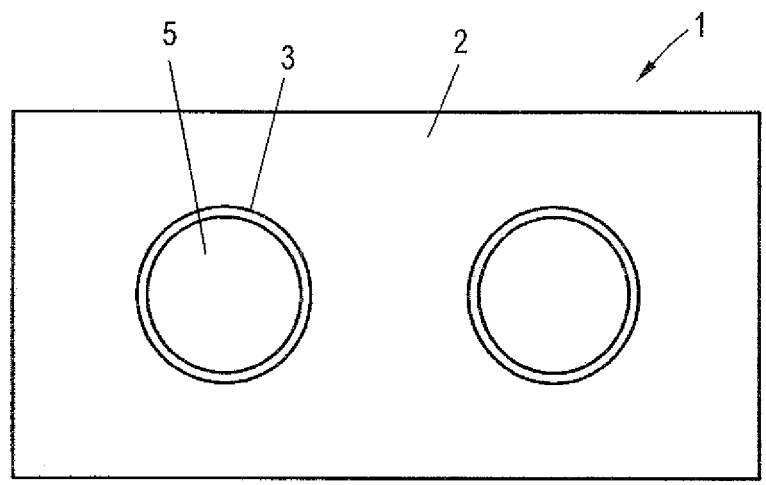
FIG. 3 shows a top view of the energy storage arrangement.

FIGS. 1 to 3 show an exemplary embodiment of an energy storage arrangement 1, including an energy storage receptacle 2 with cup-shaped receiving compartments 3, which are closed by a cover element 4 and receive one respective energy storage 5.

FIG. 1 shows the energy storage arrangement 1 in a longitudinal section. The energy storages 5 each have a positive electrode 6 and a negative electrode 7. The negative electrodes 7 are hereby each electrically conductively contacted at a bottom 9 of the receiving compartment 3, which receives the energy storage 5, by a contact tab 8. The positive electrode 6 of each of the energy storages 5 also has a contact tab 10, which electrically conductively contacts the positive electrode 6 with a connecting section 11 of the cover element 4.

The cover element 4 is arranged so as to rest on the energy storage receptacle 2, wherein regions of the cover element 4, which contact the energy storage receptacle 2 are electrically insulated from the energy storage receptacle. This prevents a short circuit between different electrostatic potentials of the energy storage receptacle 2 and the connection element 11.

FIG. 2 shows a detail view of a receiving compartment 3 with the energy storage 5 received therein. The energy storage 5 is for example a cell coil of a round cell of the type 18650 on lithium-ion basis. The cell coil 5 includes the positive electrode 6 and the negative electrode 7, which are each arranged layered separated by separators 13, 14. At the bottom side end and the end of the cell coil opposite the bottom 9 the cell coil has an insulator 15, 16. The connections of the contact tab 8 with the negative electrode 7 and the contact tab 10 with the positive electrode 6 are not further shown.

FIG. 3 shows a top view onto the energy storage arrangement 1 wherein the cover element 4 is not shown. The receiving compartments 3 are formed cylindrically and thus correspond to the geometric shape of the energy storages 5 received in them, which are configured as cell coil. The receiving compartments 3 are also configured separately and receive respectively only a single energy storage 5.

The energy storage arrangement 1 thus realizes a parallel connection of the energy storages 5 via the energy storage receptacle 2 and the connecting section 11. For the connection of the energy storage arrangement 1 in an electrical user or for connecting multiple energy storage arrangements 1 a negative electrostatic potential can be picked off at the energy storage receptacle 2 and a positive electrostatic potential can be picked off at the connecting section 11 of the cover element 4. Because the positive electrode 6 and the negative electrode 7 are only connected to the component so as to realize the parallel connections by means of the contact tabs 8, 10, significantly lower resistances result with regard to these pick-offs than in a conventional arrangement of multiple energy storage cells which are connected in parallel by means of busbars.

Figure 4:
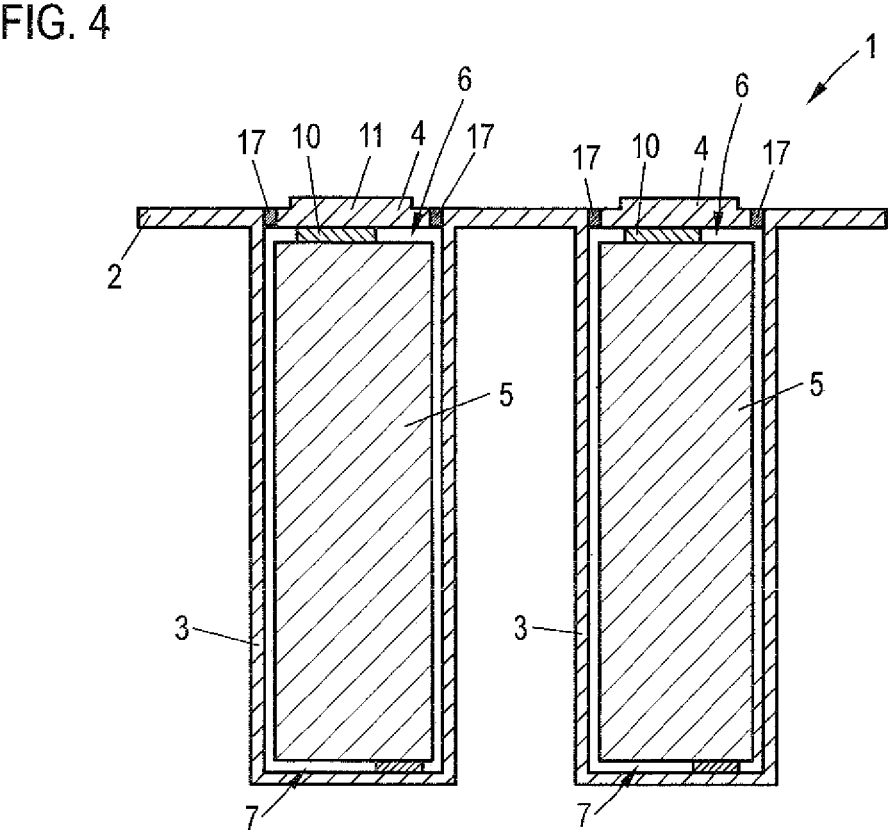
FIG. 4 shows a longitudinal sectional view of a further exemplary embodiment of an energy storage arrangement.

FIG. 4 shows a further exemplary embodiment of an energy storage arrangement 1 in longitudinal section which corresponds to the one shown in FIG. 1, wherein however each receiving compartment 3 is closed by an individual cover element 4, hereby each cover element 4 has a connecting section 11 which is electrically conductively contacted by means of a contact tab 10 with a positive electrode 6 of an energy storage 5 received in the receiving compartment 3. The connecting section 11 of each of the cover elements 4 is surrounded by an insulating ring 17, which electrically insulates the connecting section 11 from the energy storage receptacle 3.

Figure 5:
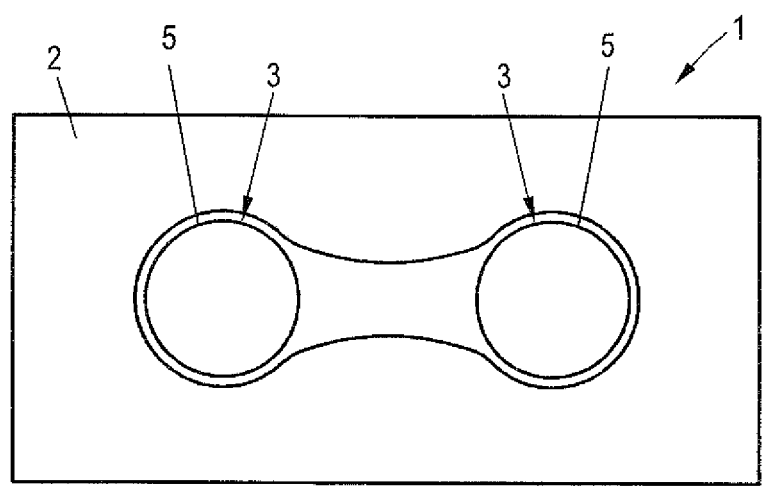
FIG. 5 shows a top view of a further exemplary embodiment of an energy storage arrangement.

FIG. 5 shows a further exemplary embodiment of an energy storage arrangement 1 in a top view wherein the cover element 4 is not shown. An energy storage receptacle 2 of the energy storage arrangement 1 includes two connected receiving compartments 3 which each receive an energy storage 5. The receiving compartments 3 thus form a common space so that the energy storage receptacle 2 when viewed n cross section surrounds the energy storages 5 only in sections. The energy storage arrangement 1 is preferably used for providing electrical energy in a motor vehicle, in particular for the supply of a fully or partially electrically operated drive aggregate. This application is also conceivable in other land vehicles such a strains but also in air vessels space and water vessels. In addition the energy storage arrangement can also be used in stationary applicators for example as buffer storage in a building whose low voltage network can be decentrally supplied.

Figure 6:
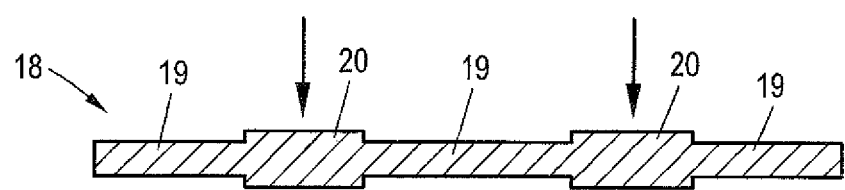
FIG. 6 shows a sheet metal part used in the method for producing an energy storage receptacle.

FIG. 6 shows a sheet metal part 18 in a sectional side view which is used for the production of an energy storage receptacle 2 shown in FIGS. 1 to 4. Hereby multiple receiving compartments 3 are formed into the sheet metal part 18 by deep drawing. the sheet metal part 18 has for this purpose a lower material thickness in regions that are not provided for the receiving compartments 3 than in regions 20 which are provided for the receiving compartments 3. By exerting a force on the regions 20 by means of a not further shown tool in the direction of the shown arrows the receiving compartments 3 are separately formed into the sheet metal part 18 wherein the geometric shape of the receiving compartments 3 corresponds to the geometric shape of the energy storages 5 to be received therein. As shown in FIG. 5 for forming connected receiving compartments 3 into the sheet metal part, the method described above is performed with a corresponding tool, wherein the shape of the region 20 is correspondingly selected.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An energy storage arrangement, comprising:
an energy storage receptacle having multiple cup-shaped receiving compartments;
energy storages received in the receiving compartments, said energy storages each having a positive and a negative electrode, with one of the positive and negative electrodes of each of the energy storages being in electrically conductive contact with an associated one of the receiving compartments via a contact tab, wherein the contact tabs of the electrodes of all energy storages are electrically conductively connected in parallel with each other via the energy storage receptacle, wherein the energy storages are received directly in the energy storage receptacle without a separate housing surrounding each of the energy storages; and
a plurality of cover elements which electrically insulatingly close each receiving compartment individually relative to the energy storage receptacle, each said cover element having a connecting section, wherein another one of the negative and positive electrodes that is not in contact with the energy storage receptacle is electrically conductively connected with the cover element, wherein the connecting section of each of said cover element is surrounded by an insulating ring which electrically insulates the connecting section from the energy storage receptacle.

2. The energy storage arrangement of claim 1, wherein the receiving compartments are separate from each other and a respective single one of the energy storages is received in each of the receiving compartments.

3. The energy storage arrangement of claim 1, wherein the receiving compartments are connected to each other, with all of the energy storages being received in the connected receiving compartments.

4. The energy storage arrangement of claim 1, wherein the one of the positive and negative electrodes of each of the energy storages is in electrically conductive contact with a bottom of the respective receiving compartment.

5. The energy storage arrangement of claim 1, wherein the energy storage receptacle is produced in one piece by deep drawing of a sheet metal part.

6. The energy storage arrangement of claim 1, wherein a respective geometric shape of the receiving compartments corresponds at least in regions to a geometric shape of the energy storages received in the receiving compartments.

7. A motor vehicle, comprising:
an energy storage compartment, said energy storage compartment comprising an energy storage receptacle having multiple cup-shaped receiving compartments, and energy storages received in the receiving compartments, said energy storages each having a positive and a negative electrode, with one of the positive and negative electrodes of each of the energy storages being in electrically conductive contact with an associated one of the receiving compartments via a contact tab, wherein the contact tabs of the electrodes of all energy storages are electrically conductively connected in parallel with each other via the energy storage receptacle, wherein the energy storages are received directly in the energy storage receptacle without a separate housing surrounding each of the energy storages, and a plurality of cover elements which electrically insulatingly close each receiving compartment individually relative to the energy storage receptacle, each said cover element having a connecting section, wherein another one of the negative and positive electrodes that is not in contact with the energy storage receptacle is electrically conductively connected with the cover element, wherein the connecting section of each of said cover element is surrounded by an insulating ring which electrically insulates the connecting section from the energy storage receptacle.

8. A method, comprising:
forming multiple receiving compartments in a sheet metal part by deep drawing;
placing energy storages in the multiple receiving compartments, respectively to produce an energy storage receptacle for an energy storage arrangement;
electrically conductively contacting an electrode of each of the energy storages with the receiving compartments via a contact tab such that the electrodes of all energy storages are electrically conductively connected in parallel with each other via the energy storage receptacle, wherein the energy storages are received directly in the energy storage receptacle without a separate housing surrounding each of the energy storages,
electrically insulatingly closing each receiving compartment individually relative to the energy storage receptacle with a cover element, each said cover element having a connecting section, wherein another one of the negative and positive electrodes that is not in contact with the energy storage receptacle is electrically conductively connected with the cover element, wherein the connecting section of each of said cover element is surrounded by an insulating ring which electrically insulates the connecting section from the energy storage receptacle.

9. The method of claim 8, wherein regions of the sheet metal part that do not form a part of the receiving compartments have a smaller material thickness than regions of the sheet metal part that form a part of the receiving compartments.

10. The method of claim 8, wherein the receiving compartments are formed separate in the sheet metal part for receiving a respective single energy storage.

11. The method of claim 8, wherein the receiving compartments are formed in the sheet metal part so as to be connected for receiving all of a plurality of energy storages.

12. The method of claim 8, wherein the receiving compartments are formed so that at least regions of the receiving compartments have a geometric shape which corresponds to a geometric shape of energy storages to be received in the receiving compartments.

* * * * *